United States Patent Office 3,535,565
Patented Oct. 20, 1970

3,535,565
LARGE DYNAMOELECTRIC MACHINE WITH A WATER-COOLED ROTOR
Karl Lang, Berlin, Germany, assignor to Siemens Aktiengesellschaft, Berlin, Germany, a corporation of Germany
Filed Mar. 26, 1969, Ser. No. 810,673
Claims priority, application Switzerland, Mar. 29, 1968, 4,730/68
Int. Cl. H02k 9/19
U.S. Cl. 310—54    10 Claims

ABSTRACT OF THE DISCLOSURE

A dynamoelectric machine has a rotor shaft with a water-cooled rotor on the shaft. An assembly is provided for supplying a flow of water to the rotor from without the machine at localities of the perimetric surface of the shaft. The assembly has rotating components coaxially mounted on the shaft to rotate together therewith and has a fixed structure which forms water-supply and water-discharge passages conjointly with the rotating components. The rotating components consist of single-piece ring-shaped bodies. A separate shaft-coupling flange member is disposed on the shaft axially beside the assembly so that when the coupling flange member is removed, the single-piece rotating components can be assembled with and disassembled from the shaft.

---

My invention relates to heavy-duty dynamoelectric power machines whose rotors, and particularly the electric windings on the rotors, are cooled by a flow of water. Such cooling is applied, for example, to the large turbogenerators in electric power stations.

In dynamoelectric machines having a water-cooled rotor or additionally also a water-cooled stator, the supply and drainage of the cooling water to the rotating parts of the machine is comparatively simple in cases where the supply can be effective through a central bore in the rotor shaft which is freely accessible from one or both of its ends.

In many cases, however, the shaft ends are not accessible, such as when an electric machine is connected at both shaft ends through releasable couplings or like connections with a turbine, a pump, an exciter machine, or other equipment, as is often the case in pumping storage plants. In such cases, the supply of the cooling water must take place via a cylindrical or jacket surface of the rotor shaft, since such machines as a rule are laid out for heavy-duty operation and have a correspondingly large shaft diameter, for example of approximately one meter. The tight sealing of the rotating faces located along a large radius may become highly problematical relative to the fixed surfaces of the water supply and discharging equipment.

It is an object of my invention, therefore, to minimize the difficulties thus encountered and to provide a heavy-duty dynamoelectric machine with means for supplying and discharging cooling water to and from the rotor and for passing the water from without the machine into and out of the rotor at localities at the peripheral surface of the shaft while encountering no appreciable deficiencies with respect to proper tightening or sealing of the junctions between the fixed and the rotating assemblies or components of the water-conducting equipment.

Another object subsidiary to the one just mentioned is to devise a water cooling system which is simple with respect to manufacture and assembly, and in which the rotating components are uniformly stressed by centrifugal forces, thus minimizing or virtually eliminating any undesired or non-uniform distortion of the sealing surfaces.

Another object akin to the one mentioned above is to afford a production of the sealing faces with an extremely close tolerance permitting a machining down to a few thousandths of one millimeter of the accurate dimensions without aggravating the possibility of readily assembling or disassembling the equipment as may be needed or desirable for the exchange of those parts that are subjected to wear.

According to my invention, the rotating components of the duct-forming means for passing a flow of water through the rotor at localities of the perimetric surface of the shaft comprise rotating components which are co-axially mounted on the shaft to rotate together therewith, and also comprise a fixed structure forming water-supply and water-discharge passages conjointly with the aforesaid rotating components. Furthermore, the rotating components mounted on the shaft are made of single-piece ring-shaped bodies, and the shaft is equipped with a separate shaft-coupling flange member located axially beside the duct-forming means so that when the flange is removed from the shaft, the single-piece rotating components can be assembled with and dismantled from the shaft by moving them over the adjacent end of the shaft.

By virtue of the fact that in such an organization according to the invention the coupling member with its flange is separable from the shaft, the single-piece ring-shaped bodies can be manufactured in a simple manner and are stressed by the occurring centrifugal forces in a completely uniform manner, thus avoiding any non-uniform deformation of sealing faces as are apt to occur when the members exhibit radially extending separating gaps or surfaces. This so greatly simplifies the otherwise very difficult production of the sealing faces, requiring an accurate machining down to a few thousandths of a millimeter, that the use of a coupling member with a flange separable from the shaft, requiring more work than a flange forged onto the shaft, becomes economically irrelevant in view of the much simpler use of the single-piece ring-shaped bodies.

According to another feature of my invention it is preferable to interconnect the rotating single-piece ring-shaped bodies of the water supply or water discharging means with each other so that they can be at least partially released from each other in the axial direction. As a result, the ring bodies can be loosened in the axial direction from the hub body on the shaft and can be displaced substantially as a subassembly so as to afford an exchange of the wear-subjected parts, for example the sealing rings, without particular difficulties, these wear-subjected parts being preferably arranged in the fixed structure of the water supply and water-discharging equipment.

The foregoing and further advantages of my invention, said advantages being set forth with particularity in the claims annexed hereto, will be further described and apparent in the following description of embodiments of the invention illustrated by way of example in the accompanying drawings, in which:

Figure 1:
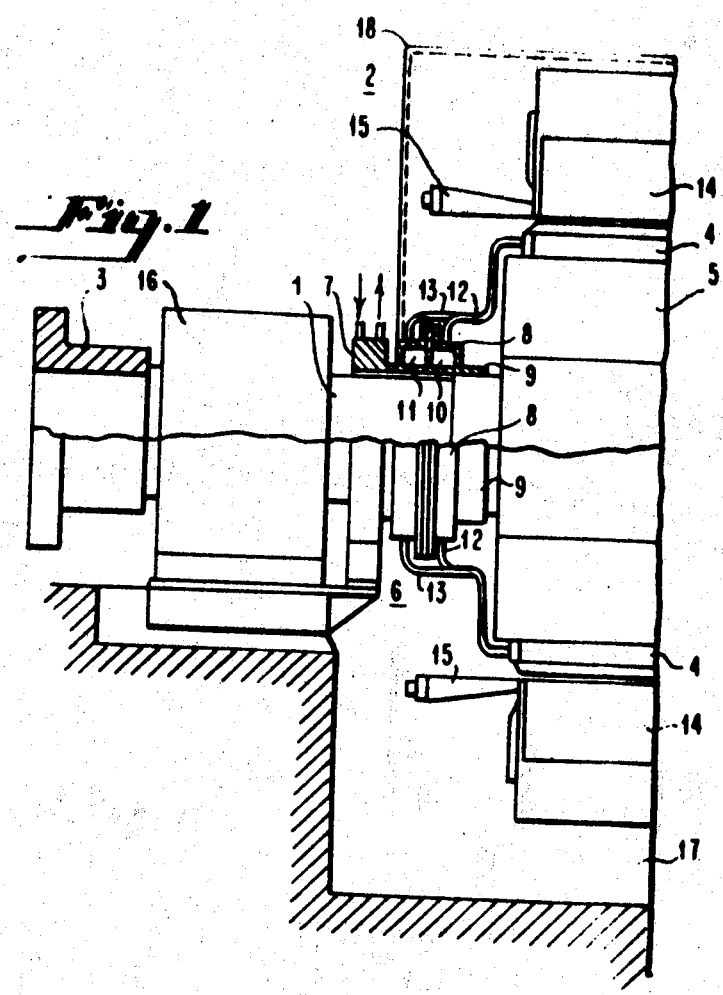
FIG. 1 shows schematically a part-sectional portion of the first embodiment, the upper half of the machine being partly in section, the lower half being substantially shown as a side elevation.

Referring first to FIG. 1, there is shown at 1 the shaft of a dynamoelectric machine such as a turbogenerator 2 of a pump-storage plant. The shaft 1 carries a coupling member 3 with a connecting flange which is removable from the shaft and can be connected by another coupling member (not shown) with a pump or other machinery to which the shaft end is to be joined. The second shaft of the illustrated machine (not shown) is likewise connected with the foregoing machine, for example a turbine, by a removable coupling member having a connecting flange. The winding 4 of the rotor 5 in the electrical machine 2 is cooled by a continuous flow of water. Since the shaft ends are not accessible, the cooling water must be supplied to the winding 4 of the rotor 5 via the cylindrical or jacket surface of the shaft 1. The water supply and discharging equipment 6 provided for this purpose is composed of a fixed structure 7 which surrounds the shaft 1 with clearance, and of a rotating assembly of components which are connected with the shaft 1 by a hub body 9 to rotate together with the shaft. To facilitate the supply of water, the fixed structure 7 is adjacent to the smaller radius of the shaft and the rotating assembly portion 8 of the equipment.

The rotating assembly 8 is composed of several single-piece ring-shaped bodies which follow each other in the axial direction and are partially connected with and releasable from each other. These ring-shaped bodies form a ring-shaped plenum chamber 10 for the cold water supply, and also a plenum chamber 11 for the heated water to be drained from the machine. The connection with the winding 4 of the rotor is effected through tubes 12 and 13, the tubes 12 pass cold water from the chamber 10 into the left side of the windings or their interspaces, and the tubes 13 remove the heater water from the right-hand side of the rotor and pass it back into the plenum chamber 11. The sides of the chambers 10, 11 facing the shaft 1 are closed by the fixed structure 7 and are sealed by slide ring gaskets.

Since the individual components of the rotating assembly 8 are composed of single-piece ring bodies, these are uniformly stressed or deformed by the occurring centrifugal forces so that the sealing faces, machined with extreme accuracy in the order of thousandths of millimeters, they may be preserved in their machine shape. This affords securing a satisfactory functioning of the respective slide-ring gaskets or shields and only slight water leakage losses are encountered. However, the parts subject to frictional wear are arranged in the fixed structure 7 because this structure is not subjected to centrifugal stresses and consequently is called upon to withstand considerably smaller stresses. For that reason, these wear-subjected parts may be subdivided in the peripheral direction so that an exchange thereof is facilitated. For this purpose, the single-ring bodies of the rotating assembly 8 are loosened from each other in the axial direction and then displaced along the shaft until the wear-subjected parts are laid free on the fixed structure and thus can be removed or exchanged.

The mounting of the water-supply and discharge equipment 6 on the shaft 1 involves no particular difficulties since the coupling member 3 forms a part separate and separable from the shaft and is joined with the shaft only after the single-piece ring bodies of the water-supply and discharge equipment 6 are placed onto and around the shaft.

If the water supply, on the one hand, and the water discharge, on the other hand, are provided at respectively different front sides of the machine, then each shaft end is to be provided with a flange coupling member.

Figure 3:
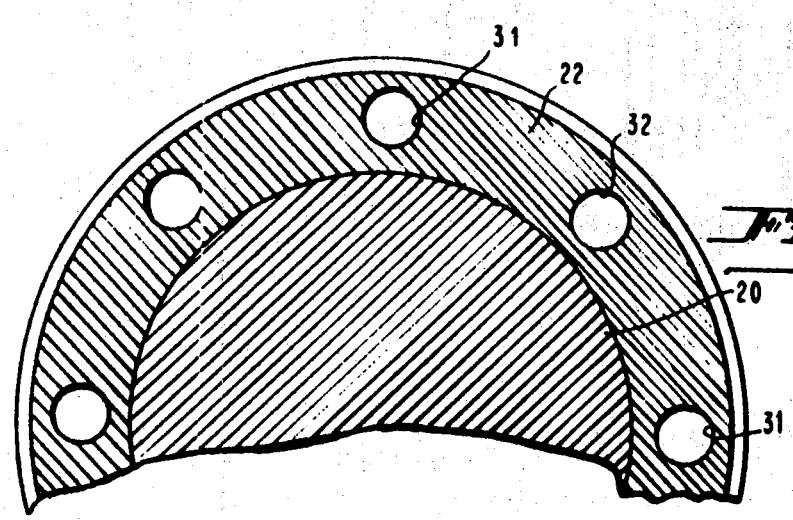
FIG. 3 is a diametrical cross section along the line III—III in FIG. 2.
Figure 2:
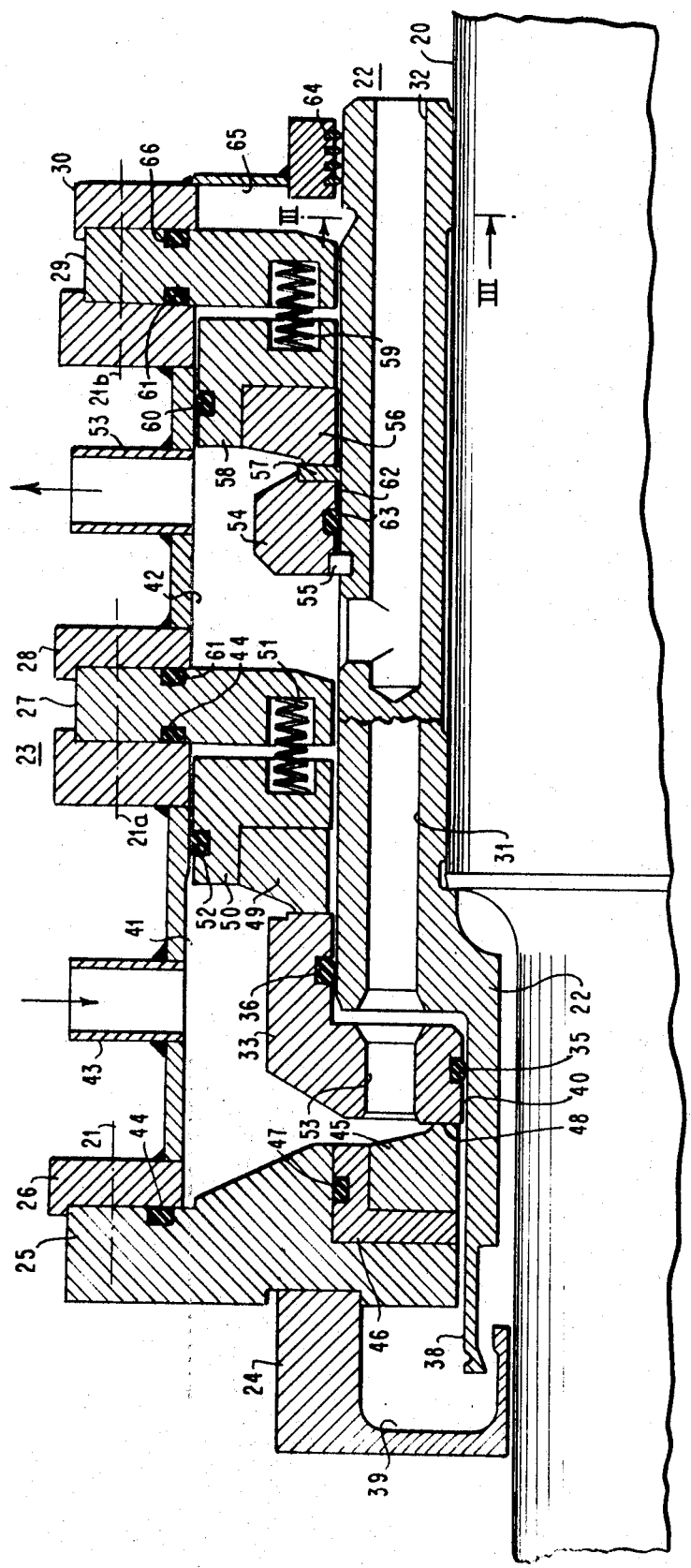
FIG. 2 is substantially an axial section through a water supply and discharging equipment of another machine according to the invention.

The water-supply and discharge device illustrated in FIGS. 2 and 3, also corresponding to the invention, differs from that shown in FIG. 1.

Mounted on the peripheral surface of the shaft 20 of an electrical machine behind a separable coupling member with connecting flange (not ilustrated in FIG. 2) there is a water-supply and discharging device composed of a singlepiece rotating member 22 in the shape of a bushing which is firmly mounted on the shaft 20, and of a fixed structure 23 composed of several axially sequential singlepiece ring bodies 24, 25, 26, 27, 28, 29 and 30 which are connected with but disconnectable from each other. The ring body 26 is shown to be composed of two flat ring parts with an intermediate spacer sleeve welded together, and the ring-shaped component 28 is composed of three welded parts in the same manner. The connection of the axially adjacent ring members is effected by screw bolts which can be loosened but which are indicated in FIG. 2 only by their center lines 21, 21a and 21b.

As schematically indicated in FIG. 3, the sleeve-shaped member 22 placed upon the shaft 20 and rotating together therewith is provided with a group of bores 31 for supplying cold water and with another group of bores 32 for carrying off the heated water. It should be noted that in FIG. 2 one bore 31 and one bore 32 are shown in the same plane of illustration, although in reality the two bores are angularly displaced from each other as apparent from FIG. 3, each cold-water bore 31 alternating with the hot-water bore 32. On the front side of the sleeve 22 facing the rotor of the machine, the bores 31 and 32 are separately connected with respective cooling channels in the rotor (not illustrated). In order to pass a largest feasible quantity of cooling water through the rotor, relatively many bores in sleeve 22 are provided; for example at a shaft diameter of 1.2 m., approximately 20 bores in each group can be used.

The bores 31 for supplying the cold water traverse almost the entire axial length of the rotating sleeve 22. A single-piece rotating sealing ring 33 of steel is coaxially arranged in front of the entrance openings of the bores 31. The ring 33 is rigidly connected with the rotating sleeve member 22 by holder pins (not illustrated) to rotate together with the sleeve. The sealing ring 33 is traversed by bores which register with the respective openings of the bores 31. Gasket rings 35 and 36 consisting fully of rubber and having a round cross section are disposed between mutually adjacent faces of the sealing ring 33 and the rotating sleeve 22, in order to minimize the escape of water along the gap. The rotating sleeve 22 further has a protruding portion 38 which forms a seal of the labyrinth type together with a fixed structure and which extends into the leakage water collecting chamber 39 formed in the outermost ring member 24, which forms part of the water supply and discharging device, the chamber being located at the side of ring 24 which faces the removable flange member. If some water escapes along the gap 40 between the rotating sleeve member 22 and the rotating sealing ring 33, the leakage water is caught in the collecting chamber 39 from which it can be removed in any suitable manner.

The axially aligned and mutually interconnected single-piece ring members 24 to 30 of the fixed portion 23 form essentially two annular plenum chambers, 41 being for the cold water and 42 for the heated water.

The plenum chamber 41 is essentially bordered by the ring bodies 25, 26 and 27. The ring body 26 constitutes the outer jacket surface of the plenum chamber 41 and is traversed by tubes 43 at several localities distributed along the periphery. The cold water is supplied through the tubes into the plenum chamber 41. The lateral walls of the plenum chamber 41 are formed by the single-piece ring bodies 25 and 27 which extend almost to the rotating sleeve member 22. Full-round gasket rings 44 of rubber are disposed in the junction faces between the ring bodies 25, 26 and 27.

A sealing ring 45 of carbon, graphite or similar carbon material is located in the single-piece ring body 25 on the side facing the rotating sealing ring 33. The carbon ring 45 is adjacent to a carrier body 46. An annular sealing ring 47 is disposed in the adjacent faces between the carrier body 46 and the ring body 25. The right outer face 48 of the carbon ring 45 glides continuously against the rotating sealing ring 33 and therefore is subject to wear. Since, therefore, the axial dimensions of the carbon ring may slightly change, the rotating sealing 33 is readily displaceable in the axial direction on the rotating sleeve 22 and a second carbon ring 49, located on the opposite axial side of the sealing ring 33 together with the appertaining carrier body 50 is connected with the supporting ring body 27 only through a spring 51 which presses the carbon ring 49 against the sealing ring 33 and the latter ring against the carbon ring 45. As a result, the continuously accurate sealing of the annular plenum chamber 41 is secured in spite of the occurring wear of the carbon rings. Between the carrier body 50 of the carbon ring 49 and the ring body 26, there is located a round rubber ring 52 for obtaining a tight seal.

The cold water supplied to the rotor of the electrical machine passes through the tubes 43 into the annular plenum chamber 41 which surrounds the shaft 20 and thence through the bores 53 of the rotating sealing ring 33 and the bores 31 of the sleeve 22 into the rotor components of the machine to be cooled. As mentioned, the bore 31 shown in FIG. 2 is represented as broken away in the vicinity of the ring-shaped body 27 and the cross-sectional cut extends from bore 31 to a location at which a bore 32 is located, thus permitting the illustration in FIG. 2 of one of the bores 32 for discharging the heated water. The bores 32 terminate in the annular plenum chamber 42 bordered by the ring bodies 27, 28 and 29. The ring body 28 which forms the jacket surface of the plenum chamber 42 carries a number of tubes 53 which are distributed along the periphery and through which the water is removed from the plenum chamber 42. A rotating single-piece sealing ring 54 is arranged directly beside the openings of the bores 32 in the plenum chamber 42 and is seated on the rotating sleeve 22 through which the ring 54 is connected through holder bodies 55. The rotating sealing ring 54 is made of steel, but on its side facing a carbon ring 56 carries an insert 57 of brass or another metal possessing good gliding properties relative to carbon. The carbon ring 56 with its carrier body 58 is connected through a spring 59 with the ring body 29 and is continuously pressed by the spring 59 against the sliding face on the rotating sealing ring 54. A full and round gasket ring 60 of rubber is disposed in the gap between the ring body 28 and the carrier body 58. Similar rings of rubber are located in the junction faces between the ring bodies 27 and 28, and 28 and 29.

The gap 62 between the rotating sleeve member 22 and the rotating sealing ring 54 is likewise sealed by a gasket ring 63 of round rubber. However, if nevertheless water escapes along the gap 62, the water can enter only into a leakage water chamber 65 of the fixed structure, which chamber is sealed by a labyrinth seal 64 directed toward the rotating sleeve member 22 and is contained in the outermost ring-shaped body 30. The escaping water collects in the leakage water chamber 65 from which it can be removed in any desired manner. The ring 66 of round rubber is further arranged for sealing purposes between the ring body 30 and the adjacent ring body 29 of the fixed structure.

In the water-supply and discharging device described above with reference to FIGS. 2 and 3, all of the wear-subjected sealing rings 45, 49 and 56 of carbon form part of the fixed structure. Consequently, they are not subjected to any centrifugal stresses. Since, further, the fixed portion of the device is composed of many ring bodies 24 to 30 which are coaxially located beside each other and are removably connected with each other, the wear-subjected parts are readily accessible because the ring bodies, after loosening the interconnections, can easily be displaced in the axial direction, thus exposing the wear-subjected bodies. Furthermore, these wear-subjected bodies may be composed in the peripheral direction of several segment-like parts in order to facilitate exchangeability. The rotating sealing rings 33 and 54, however, consist of single pieces so that they are uniformly subjected to loading by the centrifugal stresses occurring during operation of the machine. This has the result that the sealing faces become likewise deformed in a uniform manner. For the same reason, a relatively easy and more accurate machining of the sealing faces at the single-piece ring bodies is afforded, thus securing a better seal.

The described embodiment of a water-supply and discharging device according to the invention thus permits supplying the rotor of a dynamoelectric machine at the cylindrical or jacket surface of the shaft without the danger of encountering detrimental or defective sealing. This is important in all cases where the free ends of the shafts are occupied or are to be occupied with other machines such as pumps or turbines.

I claim:

1. A dynamoelectric power machine having a rotor shaft with a water-cooled rotor on said shaft and comprising duct-forming means for supplying a flow of water to said rotor from without the machine at localities of the perimetric surface of the shaft, said means having rotating components coaxially mounted on said shaft to rotate together therewith and having fixed structure forming water-supply and water discharge passages conjointly with said rotating components, said rotating components consisting of single-piece ring-shaped bodies, and a separate shaft-coupling flange member disposed on said shaft axially beside said duct-forming means, whereby— when said coupling flange member is removed—said single-piece rotating components can be assembled with and disassembled from said shaft.

2. In an electric machine according to claim 1, a plurality of said single-piece rotating components being axially connected with each other to jointly form a subassembly of said duct-forming means.

3. In an electric machine according to claim 1, said duct-forming water supply means comprising wear-resistance members and wear-subjected members in gliding and sealing engagement with each other, said wear-resistant members forming part of said single-piece rotating bodies, and said wear-subjected members forming part of said fixed structure.

4. In an electric machine according to claim 1, said rotating components of said duct-forming means comprising an elongated sleeve coaxially seated on said shaft and having two groups of longitudinal channels extending parallel to the shaft axis and being peripherally distributed along the sleeve peripherally for conducting cold and heated water respectively to and from respective axially opposite sides of said rotor, said two groups of channels having alternately different respective lengths.

5. In an electric machine according to claim 4, said duct-forming means forming two respective plenum chambers between each end of said sleeve on the one hand and said fixed structure on the other hand, water inlet and outlet means communicating with one of said respective plenum chambers, said shorter channels communicating with one of said plenum chambers and said longer channels with said other plenum chamber.

6. In an electric machine according to claim 3, said wear-subjected members consisting essentially of single-piece rings of carbon material, and said wear-resistant members being made of metal.

7. In an electric machine according to claim 4, said duct-forming means forming a plenum chamber at one end of said sleeve and said fixed structure, said rotating components further comprising a sealing ring seated on said sleeve and having bores traversing said sealing ring and forming a communication between said plenum chamber and one of said groups of channels, said fixed structure comprising a wear-subjected ring-shaped pad of carbon material in gliding engagement with said sealing ring for sealing said plenum chamber.

8. In an electric machine according to claim 4, said duct-forming means forming a plenum chamber at one end of said sleeve and said fixed structure, said rotating components further comprising a sealing ring seated on said sleeve and having bores traversing said sealing ring and forming a communication between said plenum chamber and one of said groups of channels, said fixed structure comprising two wear-subjected single piece rings in gliding engagement with said sealing ring on axially opposite sides of the latter for sealing said plenum chamber.

9. In an electric machine according to claim 8, said sealing ring being axially displaceable on said shaft in gasket-sealed relation thereto, said fixed structure forming a rigid abutment for one of said wear-subjected rings, said other ring being displaceably held in said fixed structure, and spring means between said rigid structure and said other wear-susceptible ring for maintaining said two wear-susceptible rings in gliding and sealing engagement with each other.

10. In an electric machine according to claim 1, said fixed structure and said rotating components forming conjointly a collecting chamber and a labyrinth seal, said collecting chamber communicating with the peripheral residual gap between said structure and said components for collecting leakage water.

References Cited

UNITED STATES PATENTS

| | | | |
|---|---|---|---|
| 3,320,447 | 5/1967 | Banchievi | 310—54 |
| 2,950,403 | 8/1960 | Kilner | 310—61 XR |
| 2,527,878 | 10/1950 | Fechheimer | 310—54 |
| 3,439,201 | 4/1969 | Levy et al. | 310—61 |
| 2,679,606 | 5/1954 | Baudry et al. | 310—112 |

FOREIGN PATENTS

| | | |
|---|---|---|
| 1,042,343 | 9/1966 | Great Britain. |
| 936,939 | 1955 | Germany. |

WARREN E. RAY, Primary Examiner

B. A. REYNOLDS, Assistant Examiner

U.S. Cl. X.R.

310—58, 61